(12) United States Patent
Sinz et al.

(10) Patent No.: US 11,112,421 B2
(45) Date of Patent: Sep. 7, 2021

(54) LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventors: Achim Sinz, Waiblingen (DE); Tobias Huber, Backnang (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 331 days.

(21) Appl. No.: 16/259,237

(22) Filed: Jan. 28, 2019

(65) Prior Publication Data
US 2019/0154717 A1 May 23, 2019

Related U.S. Application Data

(63) Continuation of application No. PCT/EP2017/069803, filed on Aug. 4, 2017.

(30) Foreign Application Priority Data

Aug. 4, 2016 (EP) .................................. 16182835

(51) Int. Cl.
*G01N 35/10* (2006.01)
*G01N 35/00* (2006.01)
(Continued)

(52) U.S. Cl.
CPC ........ *G01N 35/10* (2013.01); *B01L 3/502715* (2013.01); *G01N 35/00732* (2013.01);
(Continued)

(58) Field of Classification Search
CPC .. G01N 35/10; G01N 35/04; G01N 35/00732; G01N 2035/0477;
(Continued)

(56) References Cited

U.S. PATENT DOCUMENTS

| 3,273,727 A | 9/1966 | Rogers et al. |
|---|---|---|
| 3,653,485 A | 4/1972 | Donlon |

(Continued)

FOREIGN PATENT DOCUMENTS

| CN | 201045617 Y | 4/2008 |
|---|---|---|
| CN | 102109530 A | 6/2011 |

(Continued)

OTHER PUBLICATIONS

International Search Report dated Nov. 30, 2017, in Application No. PCT/EP2017/069803, 3 pp.

*Primary Examiner* — Jill A Warden
*Assistant Examiner* — Henry H Nguyen
(74) *Attorney, Agent, or Firm* — Roche Diagnostics Operations, Inc.

(57) ABSTRACT

A laboratory sample distribution system is presented. The laboratory sample distribution system comprises an optical inspection device adapted to optically inspect items that need to be optically inspected, at least one mirror device, a driver adapted to move the items to be optically inspected and to move the at least one mirror device, and a control device configured to move an item to be optically inspected relative to the optical inspection device by controlling the driver such that a field of view of the optical inspection device is extended.

14 Claims, 6 Drawing Sheets

(51) Int. Cl.
*G01N 35/04* (2006.01)
*B01L 3/00* (2006.01)
*G01D 5/14* (2006.01)
*B65G 54/02* (2006.01)
*B01L 9/06* (2006.01)

(52) U.S. Cl.
CPC .............. *G01N 35/04* (2013.01); *B01L 9/06* (2013.01); *B01L 2200/18* (2013.01); *B01L 2300/0627* (2013.01); *B65G 54/02* (2013.01); *B65G 2201/0261* (2013.01); *G01D 5/142* (2013.01); *G01N 2035/00752* (2013.01); *G01N 2035/00772* (2013.01); *G01N 2035/0406* (2013.01); *G01N 2035/0477* (2013.01); *G01N 2035/0491* (2013.01); *G01N 2035/1048* (2013.01)

(58) Field of Classification Search
CPC . G01N 2035/00772; G01N 2035/0406; G01N 2035/0491; G01N 2035/1048; G01N 2035/00752; B01L 3/502715; B01L 2200/18; B01L 2300/0627; B01L 9/06; B01L 2300/023; B01L 3/5082; B65G 54/02; B65G 2201/0261; G01D 5/142
See application file for complete search history.

(56) References Cited

U.S. PATENT DOCUMENTS

| | | | |
|---|---|---|---|
| 3,901,656 A | 8/1975 | Durkos et al. | |
| 4,150,666 A | 4/1979 | Brush | |
| 4,395,164 A | 7/1983 | Beltrop et al. | |
| 4,544,068 A | 10/1985 | Cohen | |
| 4,771,237 A | 9/1988 | Daley | |
| 5,120,506 A | 6/1992 | Saito et al. | |
| 5,295,570 A | 3/1994 | Grecksch et al. | |
| 5,309,049 A | 5/1994 | Kawada et al. | |
| 5,457,368 A | 10/1995 | Jacobsen et al. | |
| 5,523,131 A | 6/1996 | Isaacs et al. | |
| 5,530,345 A | 6/1996 | Murari et al. | |
| 5,636,548 A | 6/1997 | Dunn et al. | |
| 5,641,054 A | 6/1997 | Mori et al. | |
| 5,651,941 A | 7/1997 | Stark et al. | |
| 5,720,377 A | 2/1998 | Lapeus et al. | |
| 5,735,387 A | 4/1998 | Polaniec et al. | |
| 5,788,929 A | 8/1998 | Nesti | |
| 6,045,319 A | 4/2000 | Uchida et al. | |
| 6,062,398 A | 5/2000 | Thalmayr | |
| 6,141,602 A | 10/2000 | Igarashi et al. | |
| 6,151,535 A | 11/2000 | Ehlers | |
| 6,184,596 B1 | 2/2001 | Ohzeki | |
| 6,191,507 B1 | 2/2001 | Peltier et al. | |
| 6,206,176 B1 | 3/2001 | Blonigan et al. | |
| 6,255,614 B1 | 7/2001 | Yamakawa et al. | |
| 6,260,360 B1 | 7/2001 | Wheeler | |
| 6,279,728 B1 | 8/2001 | Jung et al. | |
| 6,293,750 B1 | 9/2001 | Cohen et al. | |
| 6,429,016 B1 | 8/2002 | McNeil | |
| 6,444,171 B1 | 9/2002 | Sakazume et al. | |
| 6,571,934 B1 | 6/2003 | Thompson et al. | |
| 7,028,831 B2 | 4/2006 | Veiner | |
| 7,078,082 B2 | 7/2006 | Adams | |
| 7,122,158 B2 | 10/2006 | Itoh | |
| 7,278,532 B2 | 10/2007 | Martin | |
| 7,326,565 B2 | 2/2008 | Yokoi et al. | |
| 7,425,305 B2 | 9/2008 | Itoh | |
| 7,428,957 B2 | 9/2008 | Schaefer | |
| 7,578,383 B2 | 8/2009 | Itoh | |
| 7,597,187 B2 | 10/2009 | Bausenwein et al. | |
| 7,850,914 B2 | 12/2010 | Veiner et al. | |
| 7,858,033 B2 | 12/2010 | Itoh | |
| 7,875,254 B2 | 1/2011 | Garton et al. | |
| 7,939,484 B1 | 5/2011 | Loeffler et al. | |
| 8,240,460 B1 | 8/2012 | Bleau et al. | |
| 8,281,888 B2 | 10/2012 | Bergmann | |
| 8,502,422 B2 | 8/2013 | Lykkegaard | |
| 8,796,186 B2 | 8/2014 | Shirazi | |
| 8,833,544 B2 | 9/2014 | Stoeckle et al. | |
| 8,973,736 B2 | 3/2015 | Johns et al. | |
| 9,056,720 B2 | 6/2015 | Van De Loecht et al. | |
| 9,097,691 B2 | 8/2015 | Onizawa et al. | |
| 9,187,268 B2 | 11/2015 | Denninger et al. | |
| 9,211,543 B2 | 12/2015 | Ohga et al. | |
| 9,239,335 B2 | 1/2016 | Heise et al. | |
| 9,423,410 B2 | 8/2016 | Buehr | |
| 9,423,411 B2 | 8/2016 | Riether | |
| 9,567,167 B2 | 2/2017 | Sinz | |
| 9,575,086 B2 | 2/2017 | Heise et al. | |
| 9,593,970 B2 | 3/2017 | Sinz | |
| 9,598,243 B2 | 3/2017 | Denninger et al. | |
| 9,618,525 B2 | 4/2017 | Malinowski et al. | |
| 9,658,241 B2 | 5/2017 | Riether et al. | |
| 9,664,703 B2 | 5/2017 | Heise et al. | |
| 9,772,342 B2 | 9/2017 | Riether | |
| 9,791,468 B2 | 10/2017 | Riether et al. | |
| 9,810,706 B2 | 11/2017 | Riether et al. | |
| 9,902,572 B2 | 2/2018 | Mahmudimanesh et al. | |
| 9,939,455 B2 | 4/2018 | Schneider et al. | |
| 9,952,242 B2 | 4/2018 | Riether | |
| 9,969,570 B2 | 5/2018 | Heise et al. | |
| 9,989,547 B2 | 6/2018 | Pedain | |
| 10,006,927 B2 | 6/2018 | Sinz et al. | |
| 10,012,666 B2 | 7/2018 | Riether | |
| 10,031,150 B2 | 7/2018 | Heise et al. | |
| 10,094,843 B2 | 10/2018 | Malinowski et al. | |
| 10,119,982 B2 | 11/2018 | Baer | |
| 10,126,317 B2 | 11/2018 | Heise et al. | |
| 10,160,609 B2 | 12/2018 | Malinowski | |
| 10,175,259 B2 | 1/2019 | Riether | |
| 10,288,634 B2 | 5/2019 | Kaeppeli | |
| 2001/0048029 A1* | 12/2001 | Kitagawa | G06K 7/10683 235/462.43 |
| 2002/0009391 A1 | 1/2002 | Marquiss et al. | |
| 2003/0092185 A1 | 5/2003 | Qureshi et al. | |
| 2004/0050836 A1 | 3/2004 | Nesbitt et al. | |
| 2004/0084531 A1 | 5/2004 | Itoh | |
| 2004/0258565 A1* | 12/2004 | Watari | G01N 35/1002 422/64 |
| 2005/0061622 A1 | 3/2005 | Martin | |
| 2005/0109580 A1 | 5/2005 | Thompson | |
| 2005/0161509 A1* | 7/2005 | Aizawa | G02B 7/1821 235/462.37 |
| 2005/0194333 A1 | 9/2005 | Veiner et al. | |
| 2005/0196320 A1 | 9/2005 | Veiner et al. | |
| 2005/0226770 A1 | 10/2005 | Allen et al. | |
| 2005/0242963 A1 | 11/2005 | Oldham et al. | |
| 2005/0247790 A1 | 11/2005 | Itoh | |
| 2005/0260101 A1 | 11/2005 | Nauck et al. | |
| 2005/0271555 A1 | 12/2005 | Itoh | |
| 2006/0000296 A1 | 1/2006 | Salter | |
| 2006/0047303 A1 | 3/2006 | Ortiz et al. | |
| 2006/0219524 A1 | 10/2006 | Kelly et al. | |
| 2007/0116611 A1 | 5/2007 | DeMarco | |
| 2007/0172396 A1 | 7/2007 | Neeper et al. | |
| 2007/0210090 A1 | 9/2007 | Sixt et al. | |
| 2007/0248496 A1 | 10/2007 | Bondioli et al. | |
| 2007/0276558 A1 | 11/2007 | Kim | |
| 2008/0012511 A1 | 1/2008 | Ono | |
| 2008/0029368 A1 | 2/2008 | Komori | |
| 2008/0056328 A1 | 3/2008 | Rund et al. | |
| 2008/0131961 A1 | 6/2008 | Crees et al. | |
| 2009/0004732 A1 | 1/2009 | LaBarre et al. | |
| 2009/0022625 A1 | 1/2009 | Lee et al. | |
| 2009/0081771 A1 | 3/2009 | Breidford et al. | |
| 2009/0128139 A1 | 5/2009 | Drenth et al. | |
| 2009/0142844 A1 | 6/2009 | Le Comte | |
| 2009/0180931 A1 | 7/2009 | Silbert et al. | |
| 2009/0322486 A1 | 12/2009 | Gerstel | |
| 2010/0000250 A1 | 1/2010 | Sixt | |
| 2010/0152895 A1 | 6/2010 | Dai | |
| 2010/0175943 A1 | 7/2010 | Bergmann | |
| 2010/0186618 A1 | 7/2010 | King et al. | |

(56) References Cited

U.S. PATENT DOCUMENTS

| | | |
|---|---|---|
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0153677 A1 | 6/2013 | Leen et al. |
| 2013/0175342 A1* | 7/2013 | Itoh .................. G06K 7/10 235/462.14 |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0231217 A1* | 8/2014 | Denninger ............. B65G 43/00 198/358 |
| 2014/0234949 A1 | 8/2014 | Wasson et al. |
| 2014/0374480 A1 | 12/2014 | Pollack |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0229565 A1 | 8/2016 | Margner |
| 2016/0341751 A1 | 11/2016 | Huber et al. |
| 2017/0108522 A1 | 4/2017 | Baer |
| 2017/0131307 A1 | 5/2017 | Pedain |
| 2017/0131310 A1 | 5/2017 | Volz et al. |
| 2017/0138971 A1 | 5/2017 | Heise et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0106821 A1 | 4/2018 | Vollenweider et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0217176 A1 | 8/2018 | Sinz et al. |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2005-338938 A | 12/2005 |
| JP | 2006-106008 A | 4/2006 |
| JP | 2006-338244 A | 12/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |

(56) References Cited

FOREIGN PATENT DOCUMENTS

| | | |
|---|---|---|
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

* cited by examiner

LABORATORY SAMPLE DISTRIBUTION SYSTEM AND LABORATORY AUTOMATION SYSTEM

CROSS-REFERENCE TO RELATED APPLICATIONS

This application is a continuation of PCT/EP2017/069803, filed Aug. 4, 2017, which is based on and claims priority to EP 16182835.5, filed Aug. 4, 2016, which is hereby incorporated by reference.

BACKGROUND

The present disclosure generally relates to a laboratory sample distribution system and to a laboratory automation system.

Known laboratory sample distribution systems are typically used in laboratory automation systems in order to transport samples contained in sample containers between different laboratory stations. Such typical laboratory sample distribution systems provide for a high throughput and for reliable operation.

Sample containers carried by a laboratory sample distribution system may contain barcodes or other identification tags in order to identify a sample contained in the sample container. Such identification tags may be read out by optical recognition devices, for example by barcode readers or cameras.

However, it has been found that reading such identification tags is complicated in certain situations, because the identification tags usually do not span a whole circumference of the sample container. As the sample containers can typically rotate freely on a transport plane of a laboratory sample distribution system, it is possible that a reading device may not able to identify a sufficient portion of the identification tag when a sample container is placed at a certain position in order to read the identification tag.

Therefore, there is a need for a laboratory sample distribution system and a laboratory automation system that can reliably perform optical inspection of items that need to be optically inspected.

SUMMARY

According to the present disclosure, a laboratory sample distribution system is presented. The laboratory sample distribution system can comprise a transport plane, an optical inspection device adapted to optically inspect items that need to be optically inspected, at least one mirror device used to view portions of the items that need to be optically inspected that would not be visible without the at least one mirror device, a driver adapted to move the items that need to be optically inspected independently from the at least one mirror device on the transport plane, and a control device configured to move an item that needs to be optically inspected relative to the optical inspection device by controlling the driver.

Accordingly, it is a feature of the embodiments of the present disclosure to provide for a laboratory sample distribution system and a laboratory automation system that can reliably perform optical inspection of items that need to be optically inspected. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
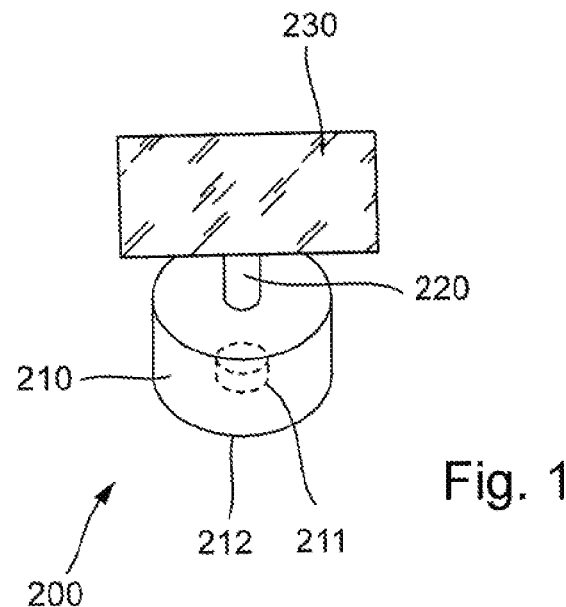
FIG. 1 illustrates a mirror device according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The presented laboratory sample distribution system can comprise an optical inspection device such as, for example, a camera, a bar code reader, a microscope, and the like. The optical inspection device can be adapted to optically inspect items that needs to be optically inspected. The items may, for example, be embodied as tubes, glass slides with tissue slices, any kind of work pieces, and the like.

The laboratory sample distribution system can further comprise at least one mirror device.

The laboratory sample distribution system can further comprise a driver adapted to directly, or indirectly, move the number of items to be optically inspected and to move the at least one mirror device. The driver may be adapted to move the items to be optically inspected independently from the mirror device.

The laboratory sample distribution system can further comprise a control device configured to move an item to be optically inspected relative to the optical inspection device by driving or controlling the driver such that a field of view of the optical inspection device is extended or enhanced. The control device may be configured to move the item to be optically inspected relative to the optical inspection device by driving or controlling the driver such that an optical angle of inspection of the optical inspection device can be enhanced.

A laboratory sample distribution system is also presented and can comprise a transport plane. The laboratory sample distribution system can further comprise a number (e.g., between 1 and 10,000) of sample container carriers. The laboratory sample distribution system can further comprise at least one mirror device comprising a base portion comprising a bottom surface for moving over the transport plane of the laboratory sample distribution system and a mirror. The laboratory sample distribution system can further comprise a driver adapted to move the sample container carriers and the mirror device on the transport plane. The laboratory sample distribution system can further comprise a control device configured to control the movement of the sample container carriers on top of the transport plane by driving or controlling the driver such that the sample container carriers move along corresponding transport paths and configured to control the movement of the mirror device on top of the transport plane by driving or controlling the driver such that the mirror device moves to a mirror position on the transport plane. The laboratory sample distribution system can further comprise a scanning device configured to scan barcodes or other information printed on a sample container carried by a sample container carrier that is placed at a scanning position on the transport plane. The scanning position can be located on the transport plane between the scanning device and the mirror position. The control device can be configured to control or drive the driver such that the sample container carrier carrying the sample container to be scanned moves to the scanning position. By moving the mirror device by the existing drive mechanism to the required mirror position, the scanning device can be able to scan barcodes not in the field of view of the scanning device.

The mirror position can be located at a position where the mirror of the mirror device helps the scanning device to see an identification tag on a sample container. Placing the sample container carrier at the scanning position on the transport plane between the scanning device and the mirror position can e.g., allow reading barcodes or other information or identification tags with great reliability independently of a rotational orientation of the sample container.

The mirror may be an optical mirror. Typically, the mirror can be mechanically fixed to the base portion and can be placed on top of the base portion. The mirror device may be embodied separate from the sample container carriers.

The mirror device can allow for a significant extension of a field of view of the optical inspection device because the mirror can be used in order to view portions of a sample container that may not be visible without the mirror. In addition, the mirror of the mirror device can be placed at a specific location on a transport plane of a sample distribution system because it can, in principle, be moved like a sample container carrier that is typically used in a laboratory sample distribution system.

The control device may e.g., be a personal computer (pc), a microprocessor, or the like.

By use of the laboratory sample distribution system, sample container carriers can be used in order to transport sample containers containing respective samples to laboratory stations or other entities. Furthermore, using a mirror device can yield the additional functionality of having at least one mirror movable on the transport plane so that devices view identification tags placed on sample containers can make use of respective mirrors in order to extend their field of view. It can be noted that the sample container carriers and the mirror devices can typically be driven based on the same drive principle.

According to an embodiment, the mirror can be oriented with a non-zero angle relative to the bottom surface. Especially, the mirror can be oriented substantially perpendicular to the bottom surface. This can allow viewing parts of a sample container at the same height as an optical viewing device like a camera.

According to an embodiment, the mirror device can comprise a magnetically active device for interaction with a magnetic field generated by the driver formed as electro-magnetic actuators such that a magnetic drive force can be applied to the mirror device. This can allow the mirror device to be driven in a similar way as a sample container carrier. The magnetically active device can, e.g., be a permanent magnet.

According to an embodiment, the mirror device can carry a number (e.g., 2 to 4) of magnetically active devices for interaction with a magnetic field generated by the driver formed as electro-magnetic actuators such that a magnetic drive force can be applied to the mirror device. The mirror device can carry more than one such as, for example, two magnetically active devices, which can allow the mirror device to not only be moved on a transport plane, but also be deliberately rotated.

According to an embodiment, the mirror device can comprise a driver formed as wheels driven by electric motors. This can allow autonomous propulsion of the mirror device without the need for interaction with external electro-magnetic actuators.

According to an embodiment, the mirror can be an angled mirror with respect to an axis substantially perpendicular to the bottom surface. This can allow for an even wider viewing area. It can be noted that there can also be more than one axis around which the mirror can be angled so that the mirror can be divided into a plurality of segments. Therefore, the mirror may comprise several mirror segments.

According to an embodiment, the mirror of the mirror device can comprise a first mirror segment and a second mirror segment. The base portion of the mirror device can comprise a first base portion segment holding the first mirror segment and a second base portion segment holding the second mirror segment. A joint can connect the first base portion segment to the second base portion segment. The first base portion segment and/or the second base portion segment can be rotatable around the joint. The rotational movement can be caused by the driver. The first base portion segment and the second base portion segment can be configured to be moved on the transport plane by the driver. This can allow for an even wider viewing area. The viewing area may be adapted on demand by the movement of the first base portion segment or the second base portion segment relative to each other. It can be noted that there may be more than two mirror segments.

According to an embodiment, the laboratory sample distribution system can comprise at least two mirror devices. With regard to the mirror devices, all embodiments and variations as discussed herein can be applied. The control device may be configured to drive the mirror devices such that they can be placed at respective mirror positions on the transport plane in order to form an angled mirror surface commonly formed by the mirrors of the mirror devices.

Such an embodiment can allow for the advantages of an angled mirror as discussed above without the need to provide for an actually angled mirror. Rather, two mirrors can be used in combination to form a common angled mirror.

According to an embodiment, the control device can be configured to drive the mirror device such that it can be rotated on the transport plane especially while the mirror device is passing a sample container or while a laboratory sample container is passing the mirror device. This can allow for the mirror device to help read an identification tag on a sample container even if the sample container is moving or if a similar device is moving. This can increase throughput of a reading apparatus placed on or besides the transport plane. Rotating the mirror device can especially be accomplished when the mirror device comprises at least two magnetically active devices.

A laboratory sample distribution system is also presented. The laboratory sample distribution system can comprise a transport plane and a number of sample container carriers. It can further comprise at least one mirror positioned fixedly at a mirror position on or besides the transport plane. The laboratory sample distribution system can further comprise a driver adapted to move the sample container carriers on the transport plane. The laboratory sample distribution system can further comprise a control device configured to control the movement of the sample container carriers on top of the transport plane by driving the driver such that the sample container carriers move along corresponding transport paths. By use of this type of laboratory sample distribution system, the advantages as discussed above with respect to having a mirror in a laboratory sample distribution system can be applied for a laboratory sample distribution system without the need to provide for a movable mirror. Rather, it has been found that similar advantages can be achieved if the mirror is placed fixedly on or besides the transport plane.

According to an embodiment, the scanning device and/or the mirrors can be configured to allow a 360° view of the scanning device on the sample container at the scanning position. This can allow for high reliability when reading barcodes or other identification tags. The 360° view can be achieved by using the mirror or mirrors to see portions of the sample container that would not be visible without a mirror.

According to an embodiment, the control device can be configured to move sample container carriers each carrying a sample container successively to and away from the scanning position. This can allow for a successive scanning of barcodes or other information or identification tags being placed on respective sample containers.

According to an embodiment, the driver can be formed as electro-magnetic actuators located below the transport plane in a grid having rows and columns and controllable by the control device. The sample container carriers can each comprise a magnetically active device, e.g., a permanent magnet, for interaction with a magnetic field generated by the electro-magnetic actuators such that a magnetic drive force can be applied to the sample container carriers. This implementation can allow for a reliable and efficient driving of the sample container carriers and the mirror devices.

According to an alternative embodiment, the driver can be formed as wheels driven by electric motors located in the sample container carriers and controllable by the control device. This can allow for an alternative implementation having wheels in order to drive the sample container carriers and the mirror devices.

A laboratory automation system is also presented. The laboratory automation system can comprise a number of laboratory stations, preferably pre-analytical, analytical and/or post-analytical stations. The laboratory automation system can further comprise a laboratory sample distribution system as described above. With regard to the laboratory sample distribution system, all embodiments and variations as discussed herein can be applied.

The stations may be arranged adjacent to the laboratory sample distribution system. The laboratory sample distribution system may be adapted to transport the sample container carriers and/or sample containers between the stations.

Pre-analytical stations may be adapted to perform any kind of pre-processing of samples, sample containers and/or sample container carriers.

Analytical stations may be adapted to use a sample or part of the sample and a reagent to generate a measuring signal, the measuring signal indicating if and in which concentration, if any, an analyte exists.

Post-analytical stations may be adapted to perform any kind of post-processing of samples, sample containers and/or sample container carriers.

The pre-analytical, analytical and/or post-analytical stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, and a sealing/desealing station.

A method of operating the laboratory sample distribution system as described above is also presented. The method can comprise moving the laboratory sample container carrier on the transport plane to the scanning position, moving the mirror device to reflect the information to the optical inspection device, and detecting the information by the optical inspection device, in particular during the movement of the laboratory sample container carrier.

Referring initially to FIG. 1, FIG. 1 shows a mirror device 200 according to an embodiment. The mirror device 200 can comprise a base portion 210. At a lower side of the base portion 210 that is not visible in FIG. 1, a bottom surface 212 can be provided. The bottom surface 212 can be configured as a flat surface so as to provide for a stable standing of the mirror device 200 on a transport plane of a laboratory sample distribution system.

It can be noted that the bottom surface 212 can define the orientation of the mirror device 200 in its typical use situation.

On the base portion 210, a holder 220 can be provided on which a mirror 230 can be positioned. The mirror 230 can be configured as a flat optical mirror that can be oriented substantially perpendicular to the bottom surface 212. Thus, the mirror 230 can provide for the possibility to extend a viewing region of an optical inspection device positioned on the same height above a transport plane as the mirror 230.

Inside of the base portion 210, a magnetically active device 211 can be provided in the form of a permanent magnet so that the mirror device 200 can be moved over a transport plane of a laboratory sample distribution system by interaction between the permanent magnet 211 and electromagnetic actuators of the laboratory sample distribution system. This will be described further below with reference to FIGS. 3 and 4.

Figure 2:
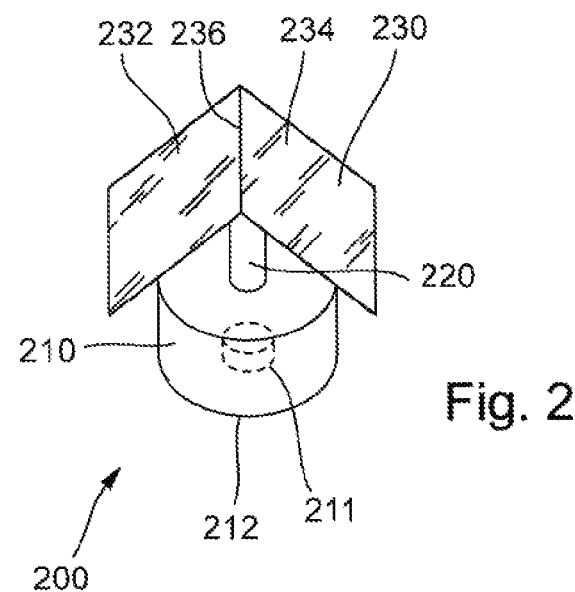
FIG. 2 illustrates a mirror device according to another embodiment of the present disclosure.

FIG. 2 shows an alternative embodiment of a mirror device 200. In contrast to the embodiment shown in FIG. 1, the mirror 230 can be embodied as an angled mirror having a first mirror surface 232 and a second mirror surface 234, which can abut each other at an axis 236. The axis 236 can be oriented substantially perpendicular to the bottom surface 212 so that the axis 236 can be in a vertical orientation in a typical use of the mirror device 200.

The angled mirror 230 can provide for an even further extension of a viewing region of an optical inspection device and can be advantageously used in certain situations.

Figure 3:
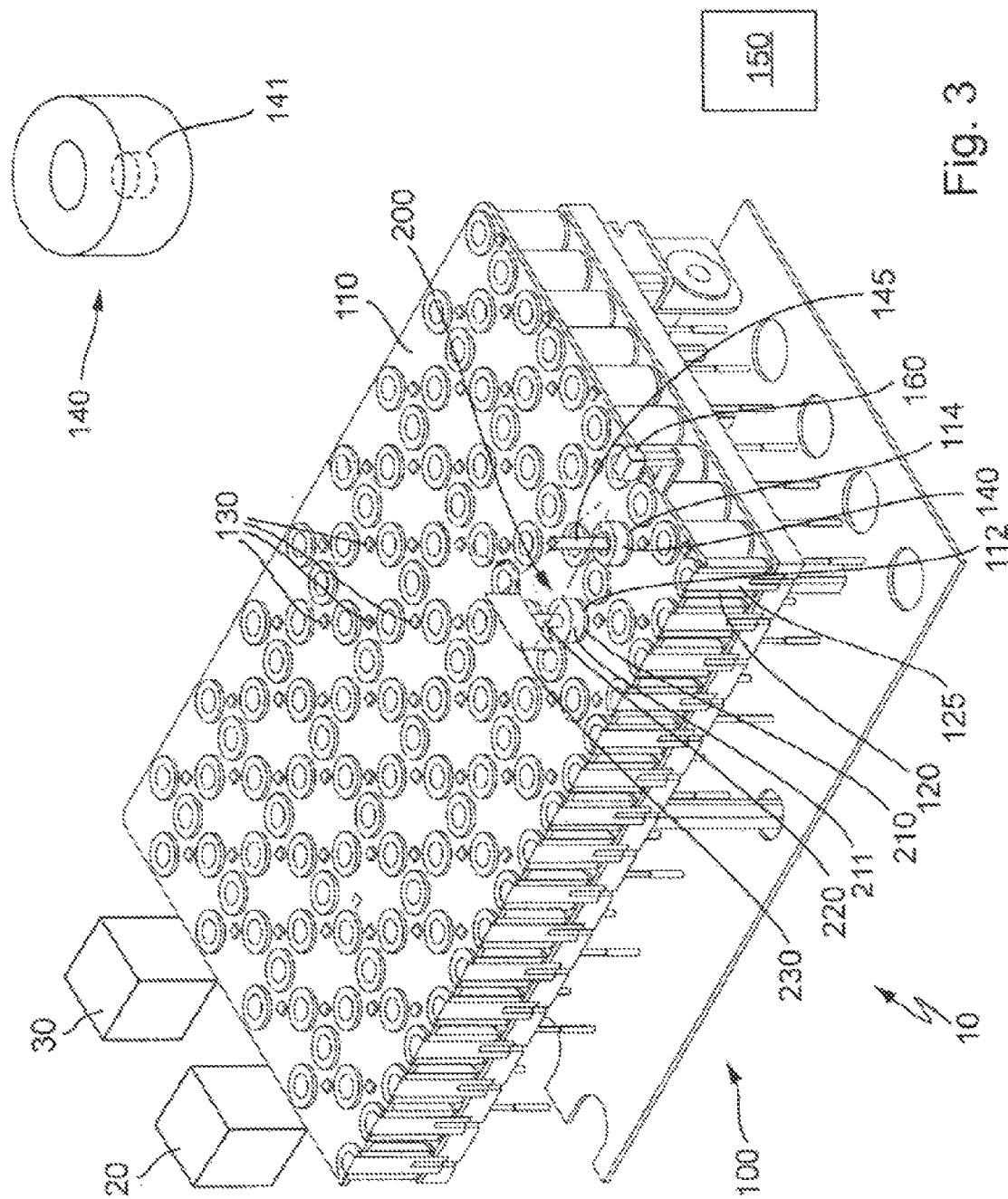
FIG. 3 illustrates a laboratory automation system according to an embodiment of the present disclosure.

FIG. 3 shows a laboratory automation system 10. The laboratory automation system 10 can comprise a first laboratory station 20, a second laboratory station 30 and a laboratory sample distribution system 100.

The laboratory sample distribution system 100 can comprise a transport plane 110. Below the transport plane 110, a plurality of electro-magnetic actuators 120 can be arranged in rows and columns. Each electro-magnetic actuator 120 can comprise a respective ferromagnetic core 125.

A number of position sensors 130, embodied as Hall-sensors, can be distributed over the transport plane 110.

The laboratory sample distribution system 100 can further comprises a plurality of sample container carriers 140. A sample container carrier 140 can carry a respective sample container 145, embodied as laboratory tube. It can be noted that only one laboratory sample container carrier 140 carrying a respective sample container 145 is shown in FIG. 3 for exemplary purposes. A typical sample distribution system 100 can comprise a plurality of such sample container carriers 140. The sample containers 145 can be the items to be optically inspected.

Each sample container carrier 140 can comprise a magnetically active device 141 in the form of a permanent magnet. Thus, magnetic fields generated by the electro-magnetic actuators 120 can drive a sample container carrier 140 over the transport plane 110. Furthermore, the magnetic field generated by the permanent magnet 141 of a sample container carrier 140 can be detected by the position sensors 130 so that a feedback regarding the position of a sample container carrier 140 can be obtained.

Both the electro-magnetic actuators 120 and the position sensors 130 can be electrically connected to a control device 150. The control device 150 can drive or control the electro-magnetic actuators 120 such that the sample container carriers 140 can move along corresponding transport paths. It can also determine the position of each sample container carrier 140.

The laboratory stations 20, 30 can be arranged adjacent to the transport plane 110. It can be noted that these two laboratory stations 20, 30 are only shown for exemplary purposes in FIG. 3 and that a typical laboratory automation system 10 can comprise more than two laboratory stations 20, 30.

On the transport plane 110, a mirror device 200 can be provided according to the embodiment shown in FIG. 1. The mirror device can also be part of the laboratory sample distribution system 100.

The mirror device 200 can be placed at a mirror position 112, which can be defined as an electro-magnetic actuator 120 where a mirror can be of most use. The mirror device 200 can comprise a magnetically active device 211 in the form of a permanent magnet so that it can be moved and detected on the transport plane 110 in the same way as the sample container carrier 140. The control device 150 can control the electro-magnetic actuators 120 such that the mirror device 200 can move to the mirror position 112.

Adjacent to the transport plane 110, an optical inspection device in the form of an optical recognition device, or scanning device, here in the form of a camera 160, can be provided which can be adapted to detect barcodes or other identification tags located on a sample container 145.

In the situation shown in FIG. 3, the sample container carrier 140 carrying its sample container 145 can be placed at a scanning position 114, which can be an electro-magnetic actuator 120 over which a sample container 145 can best be seen or read out by the camera 160.

If a barcode or other identification tag on the sample container 145 is not in an orientation that it can directly be seen by the camera 160, the mirror device 200 by its mirror 230 can support the camera 160 to see the barcode or identification tag on the sample container 145. Thus, the camera 160 can identify and read the barcode or identification tag on the sample container 145 even if it is not directly orientated in the direction of the camera 160.

Figure 4:
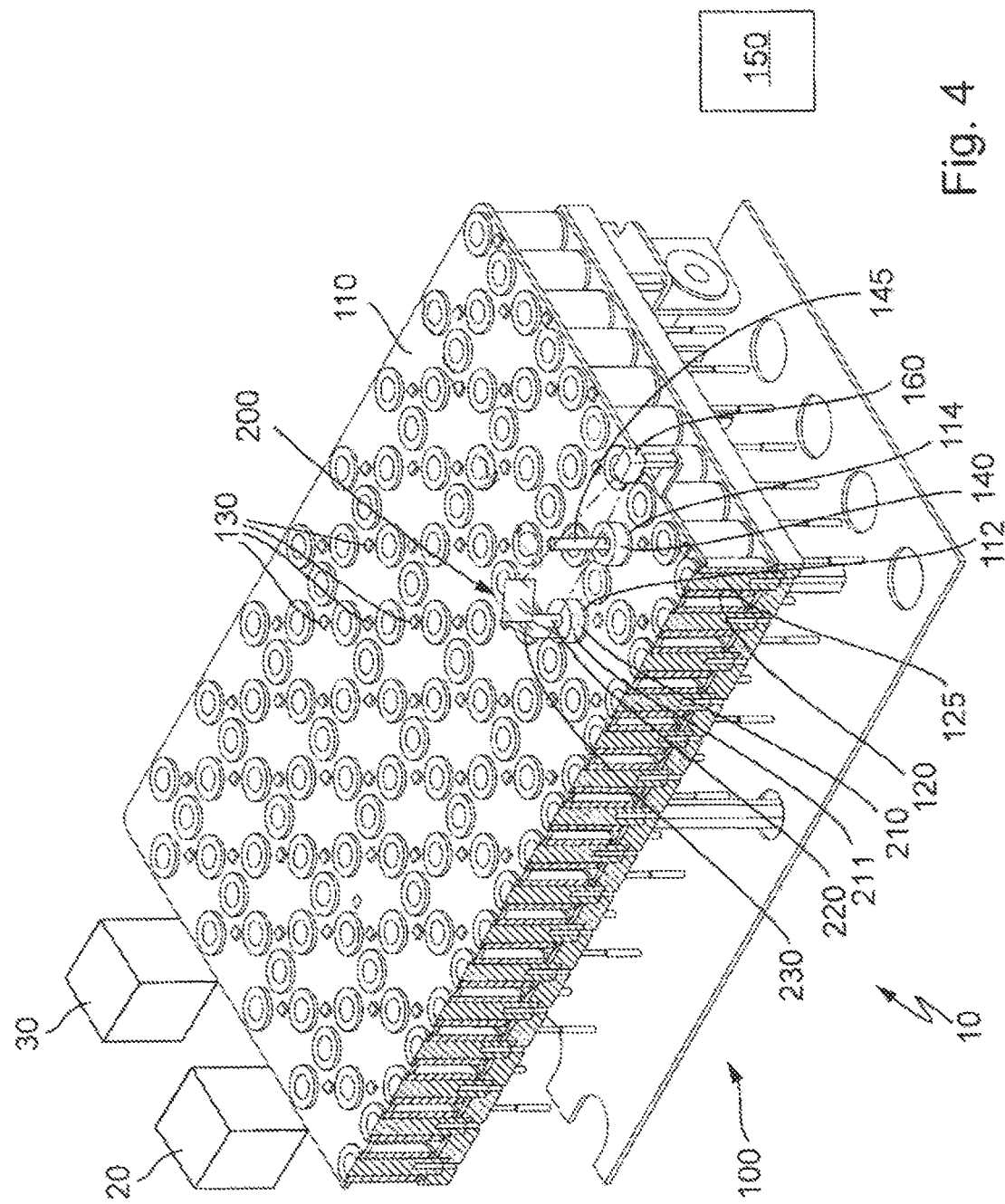
FIG. 4 illustrates a laboratory automation system according to another embodiment of the present disclosure.

FIG. 4 shows an alternative embodiment of the laboratory automation system 10 of FIG. 3 in that a mirror device 200 according to the embodiment shown in FIG. 2 can be provided on the transport plane 110. Thus, the mirror device 200 can have an angled mirror 230. This can provide for an alternative and—at least in some situations—better field of view or viewing region of the camera 160.

Figure 5:
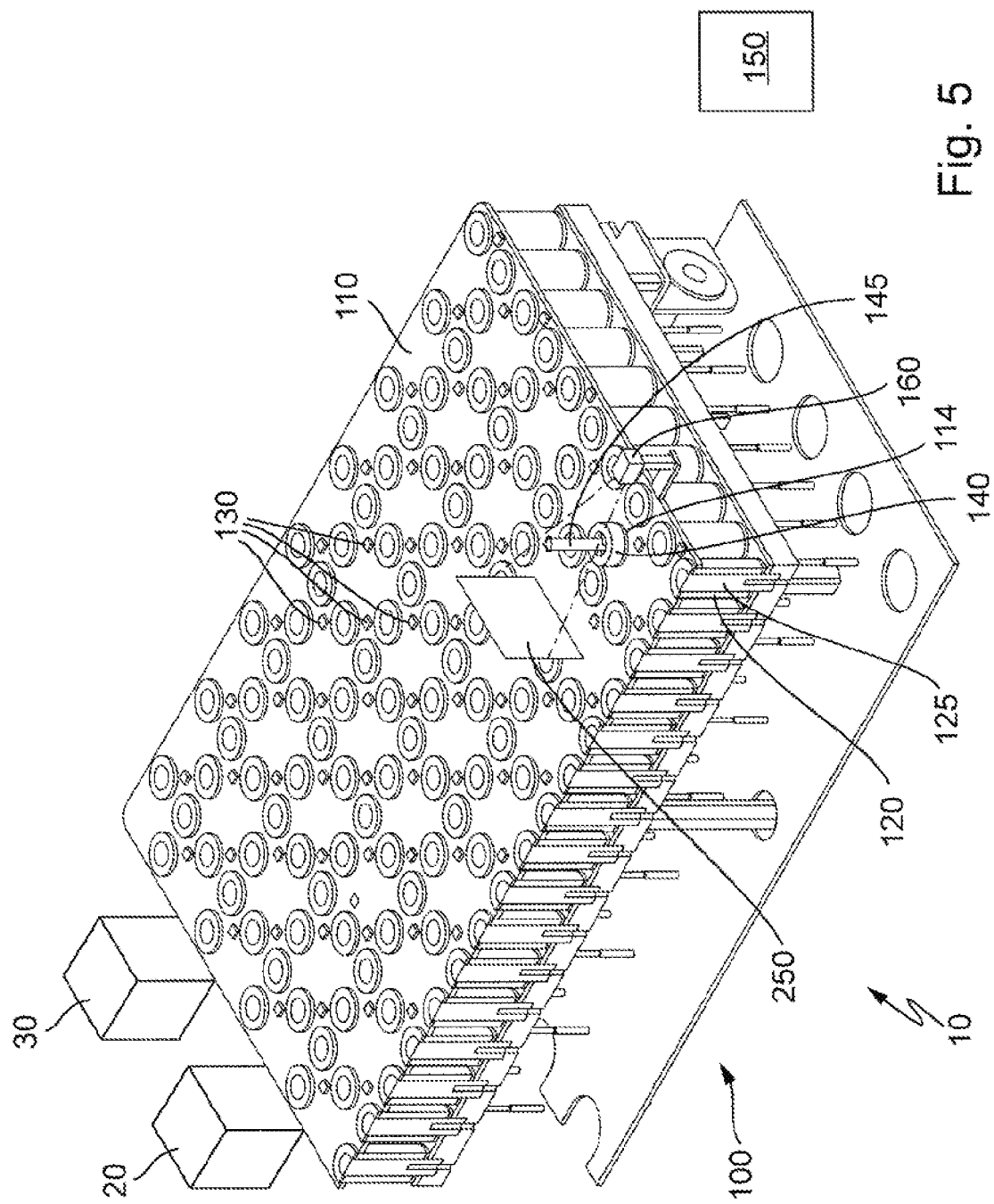
FIG. 5 illustrates a laboratory automation system according to yet another embodiment of the present disclosure.

FIG. 5 shows a further alternative embodiment of a laboratory automation system 10, wherein a fixed mirror 250 can be provided on the transport plane 110. The fixed mirror 250 can be provided at a position on the transport plane 110 which can be similar to the mirror position 112 shown in FIGS. 3 and 4. Thus, the fixed mirror 250 can yield the same functionality as the mirrors shown in FIGS. 3 and 4.

Figure 6:
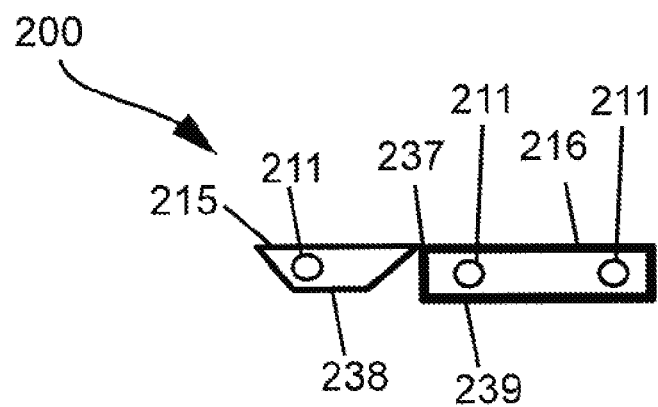
FIG. 6 illustrates another mirror device according to an embodiment of the present disclosure.
Figure 7:
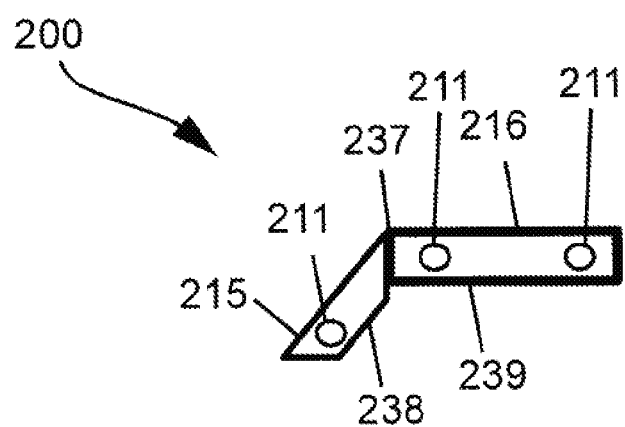
FIG. 7 illustrates the mirror device of FIG. 6 in another functional position according to an embodiment of the present disclosure.

FIG. 6 and FIG. 7 show an alternative embodiment of a mirror device 200. The mirror 230 of the mirror device 200 can comprise a first mirror segment 238 and a second mirror segment 239. The first mirror segment 238 can be held by a first base portion segment 215 having one magnetically active device 211. The second mirror segment 239 can be held by a second base portion segment 216 having two magnetically active devices 211. The first base portion segment 215 and the second base portion segment 216 together can form the base portion.

A joint 237 can connect first base portion segment 215 to the second base portion segment 216. When both base portion segments 215, 216 are moved relative to each other, at least one base portion segment can perform a rotational movement and the joint 237 can form the rotation axis. The rotational movement can be caused by the magnetic fields generated by the electro-magnetic actuators 120.

FIG. 6 and FIG. 7 show the mirror device 200 for different rotated positions of the first base portion segment 215 relative to the second base portion segment 216.

Figure 8:
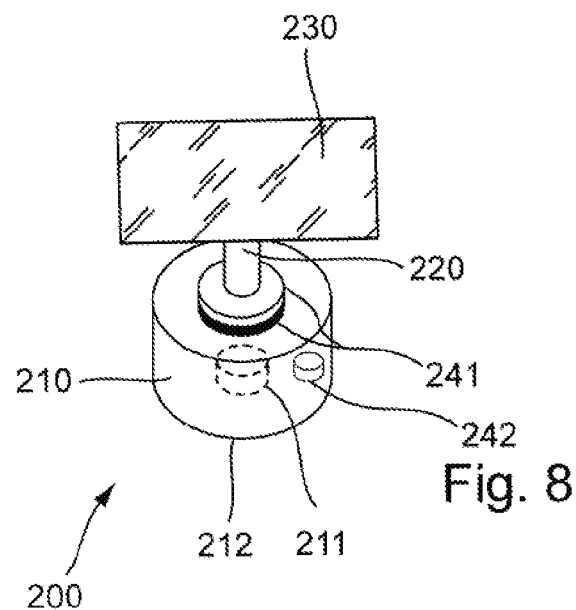
FIG. 8 illustrates a mirror device according to yet another embodiment of the present disclosure.

FIG. 8 shows an alternative embodiment of a mirror device 200. The mirror device 200 can comprise an electric motor 241 adapted to rotate the mirror 230 relative to the base portion 210. The mirror device 200 can further comprise a power source 242. The power source 242 may e.g., be embodied as a battery, a supercapacitor, or an inductive unit for receiving energy from the magnetic field generated by the electro-magnetic actuators 120. In order to establish a desired field of view, the control device 150 may control the electric motor 241 such that the field of view of the camera 160 can be optimized. The field of view of the camera 160 may be optimized by a tracking rotational movement of the mirror 230 during a movement of a sample container carrier 140 through the field of view of the camera 160.

Figure 9:
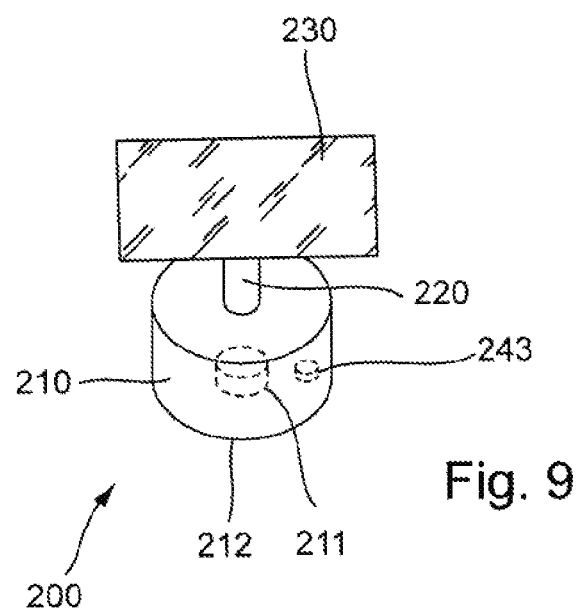
FIG. 9 illustrates a mirror device according to still yet another embodiment of the present disclosure.

FIG. 9 shows an alternative embodiment of a mirror device 200. The base portion 210 can further comprise a second magnetically active device 243 causing a magnetic anisotropy, i.e., the magnetic properties of the base portion 210 depend on an angularity of the base portion 210. Thus, it can be possible to rotate the mirror device 200 on the transport plane 110 around a vertical axis by a magnetic force resulting from an interaction between the magnetic field of the electro-magnetic actuators 120 and the anisotropic magnetic field of the base portion 210. In order to establish a desired field of view, the control device 150 may control the electro-magnetic actuators 120 such that the field of view of the camera 160 can be optimized. The field of view of the camera 160 may be optimized by a tracking rotational movement of the mirror 230 during a movement of a sample container carrier 140 through the field of view of the camera 160.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory sample distribution system, the laboratory sample distribution system comprising:
   a transport plane;
   an optical inspection device adapted to optically inspect items that need to be optically inspected;
   at least one mirror device used to view portions of the items that need to be optically inspected that would not be visible without the at least one mirror device, wherein the at least one mirror device comprises a base portion comprising a bottom surface for moving over the transport plane of the laboratory sample distribution system and a mirror, wherein the mirror comprises a first mirror segment and a second mirror segment and the base portion comprises a first base portion segment holding the first mirror segment and a second base portion segment holding the second mirror segment, wherein the mirror device comprises a joint connecting the first base portion segment to the second base portion segment such that the first base portion segment and/or the second base portion segment are rotatable around the joint and wherein the first base portion segment and the second base portion segment are configured to be moved on the transport plane by the driver;
   a driver adapted to move the items that need to be optically inspected independently from the at least one mirror device on the transport plane; and
   a control device configured to move the items that needs to be optically inspected relative to the optical inspection device by controlling the driver.

2. The laboratory sample distribution system according to claim 1, wherein the mirror is oriented perpendicular to the bottom surface.

3. The laboratory sample distribution system according to claim 1, wherein the mirror is an angled mirror with respect to an axis perpendicular to the bottom surface.

4. The laboratory sample distribution system according to claim 1, further comprising,
   a number of sample container carriers adapted to carry a respective sample container, wherein the sample containers are the items that need to be optically inspected.

5. The laboratory sample distribution system according to claim 4, wherein the driver is adapted to move the sample container carriers and the mirror device on the transport plane.

6. The laboratory sample distribution system according to claim 4, wherein the control device is configured to control the movement of the sample container carriers on top of the transport plane by controlling the driver such that the sample container carriers move along corresponding transport paths and is configured to control the movement of the mirror device on top of the transport plane by controlling the driver such that the mirror device moves to a mirror position on the transport plane.

7. The laboratory sample distribution system according to claim 4, further comprising,
   a scanning device forming the optical inspection device configured to scan a barcode or other information placed on a sample container carried by a sample container carrier that is placed at a scanning position on the transport plane, wherein the scanning position is located on the transport plane between the scanning device and a mirror position.

8. The laboratory sample distribution system according to claim 1, the mirror device comprises a magnetically active device for interaction with a magnetic field generated by the driver formed as electromagnetic actuators such that a magnetic drive force is applied to the mirror device.

9. The laboratory sample distribution system according to claim 1, wherein the control device is configured to drive the mirror device such that it is rotated on the transport plane.

10. The laboratory sample distribution system according to claim 7, wherein the scanning device and/or the mirror is/are configured to allow a 360° view of the scanning device on the sample container at the scanning position.

11. The laboratory sample distribution system according to claim 7, wherein the control device is configured to move the number of sample container carriers, each carrying a sample container successively to and away from the scanning position.

12. The laboratory sample distribution system according to claim 4, wherein the driver is formed as electromagnetic actuators located below the transport plane and controllable by the control device and the sample container carriers each comprise a magnetically active device for interaction with a magnetic field generated by the electromagnetic actuators such that a magnetic drive force is applied to the sample container carriers.

13. A laboratory automation system, the laboratory automation system comprising:
    a number of laboratory stations; and
    a laboratory sample distribution system according to claim 1.

14. A laboratory sample distribution system, the laboratory sample distribution system comprising:
    a transport plane;
    an optical inspection device adapted to optically inspect items that need to be optically inspected;
    at least one mirror device used to view portions of the items that need to be optically inspected that would not be visible without the at least one mirror device, wherein the at least one mirror device comprises a base portion comprising a bottom surface for moving over the transport plane of the laboratory sample distribution system and a mirror;

a driver adapted to move the items that need to be optically inspected independently from the at least one mirror device on the transport plane, wherein the driver is adapted to move the sample container carriers and the mirror device on the transport plane;

a number of sample container carriers adapted to carry a sample container, wherein the sample containers are the items that need to be optically inspected; and a control device configured to move the items that needs to be optically inspected relative to the optical inspection device by controlling the driver, wherein the control device is configured to control the movement of the sample container carriers on top of the transport plane by controlling the driver such that the sample container carriers move along corresponding transport paths and is configured to control the movement of the mirror device on top of the transport plane by controlling the driver such that the mirror device moves to a mirror position on the transport plane.

* * * * *